United States Patent [19]

Silver

[11] Patent Number: 5,532,020
[45] Date of Patent: Jul. 2, 1996

[54] LOW CALORIE TABLESPREAD MADE FROM LIQUID TRIGLYCERIDE OILS

[75] Inventor: Richard S. Silver, Wilmette, Ill.

[73] Assignee: Nabisco, Inc., Parsippany, N.J.

[21] Appl. No.: 448,673

[22] Filed: May 24, 1995

[51] Int. Cl.$^6$ ..................................................... A23D 7/01
[52] U.S. Cl. ........................... 426/604; 426/603; 426/602
[58] Field of Search ..................................... 426/604, 603, 426/602

[56] References Cited

U.S. PATENT DOCUMENTS

| | | | |
|---|---|---|---|
| 4,238,520 | 12/1980 | Miller et al. | 426/573 |
| 4,273,790 | 6/1981 | Bosco et al. | 426/335 |
| 4,273,795 | 6/1981 | Bosco et al. | 426/602 |
| 4,383,098 | 5/1983 | Bolen | 426/646 |
| 4,468,408 | 8/1984 | Bosco et al. | 426/604 |
| 4,865,867 | 9/1989 | Platt et al. | 426/603 |
| 4,882,187 | 11/1989 | Izzo et al. | 426/335 |
| 4,990,355 | 2/1991 | Gupta et al. | 426/602 |
| 5,063,076 | 11/1991 | Finlayson et al. | 426/602 |
| 5,080,921 | 1/1992 | Reimer | 426/564 |
| 5,082,684 | 1/1992 | Fung | 426/602 |
| 5,126,161 | 6/1992 | Poppe et al. | 426/573 |

OTHER PUBLICATIONS

Schick, M. J., *Nonionic Surfactants: Physical Chemistry*, pp. 439–447, (Marcel Dekker, Inc., New York, NY; 1987).

Kirk and Othmer, *Encyclopedia of Chemical Technology*, pp. 702–703 (Interscience Publishers, Inc., New York, NY; 1950).

*Primary Examiner*—Carolyn Paden

[57] ABSTRACT

The present invention is directed to a reduced-fat margarine-type spread prepared from liquid, edible vegetable oils. The spread is a two-phase emulsion comprising a continuous aqueous phase and a dispersed liquid oil phase. The emulsion contains from about 45% to about 65% liquid vegetable oil, from about 15% to about 20% of calcium gluconate, from about 18% to about 28% of water and from about 0.2% to about 1.2% of a hydrophilic emulsifier.

13 Claims, No Drawings

LOW CALORIE TABLESPREAD MADE FROM LIQUID TRIGLYCERIDE OILS

FIELD OF THE INVENTION

The present invention relates to a tablespread product made from liquid, edible vegetable oils. More particularly, the present invention is directed to a method for thickening liquid vegetable oils to produce a tablespread product similar to margarine.

BACKGROUND OF THE INVENTION

Margarine is made from vegetable oils that have been hydrogenated and crystallized to remove high-melting triglycerides in order to achieve the proper spreading texture. The vegetable oils may also be blended with lesser quantities of animal fats. The use of hydrogenated vegetable oils has the disadvantage of reducing the more nutritionally desirable unsaturated fatty acids and increasing less desirable saturated and trans- mono-unsaturated fatty acids.

Many efforts have been made to reduce the amount of fat in margarine and to provide a reduced calorie margarine which still has the texture and mouthfeel of full fat margarine. These efforts have also been directed to substituting liquid triglyceride oils for saturated animal fats or hydrogenated vegetable oils. The advantages of liquid triglyceride oils in terms of health benefits have been documented many times. U.S. Pat. No. 5,080,921 to Reimer discloses an emulsion comprising a continuous aqueous phase and a dispersed fat phase. The emulsion contains one or more thickening agents which can be selected from the group consisting of alginates, xanthan gum, locust bean gum, guar gum, agar, carrageenans, pectins, methyl cellulose, methyl ethyl cellulose, carboxymethyl cellulose, hydroxypropyl cellulose, hydroxypropylmethyl cellulose, gelatin and combinations thereof.

U.S. Pat. No. 5,126,161 to Poppe relates to a stabilizing and emulsifying composition for the preparation of low-fat spreads containing from 70 to 85% by weight of gelatin, from 7.5 to 15% by weight of iotacarrageenan and 7.5 to 15% by weight of xanthan gum.

U.S. Pat. No. 5,082,684 to Fung is directed to a low calorie fat substitute comprising a non-flowable aqueous phase and an oil phase with the interaction between the aqueous and oil phases resulting in a pourable emulsion. The aqueous phase is rendered non-flowable by the addition of an effective amount of a gel-forming composition selected from the group consisting of alginates, xanthans, carrageenans, succinoglucans and scleroglucans.

U.S. Pat. No. 5,063,076 to Finlayson, et al. is directed to fat-continuous emulsions with a reduced fat content. The emulsions comprise a fatty phase, a thickened proteinaceous aqueous phase and an emulsifier system. The emulsifier system includes mono fatty acid esters of both saturated and unsaturated fatty acids.

U.S. Pat. No. 4,882,187 to Izzo, et al. describes a process for preparing an edible spread having a fat content lower than margarine. The spread has a continuous fat phase and two distinct aqueous phases.

U.S. Pat. No. 4,865,867 to Platt, et al. describes a low fat spread and process for preparing a low fat spread which is a water-in-oil emulsion. The aqueous phase has at least 8% by weight of one or more proteins derived from milk and from 0.1% to 1.2% by weight of a modified starch.

U.S. Pat. No. 4,273,795 to Bosco, et al. is directed to a low fat spread and a process for preparing the spread. The spread comprises from 10 to 30% of a dispersed fat and a continuous aqueous phase containing an emulsion stabilizer and an emulsifier system including both lipophilic and hydrophilic emulsifiers. The emulsion stabilizers are hydrophilic colloids which are selected from the group consisting of microcrystalline cellulose, carrageenan, guar gum, alginate, xanthan gum, methyl cellulose, carboxymethyl cellulose, ethyl cellulose, hydroxypropylmethyl cellulose, dextrins, starch, gelatin, locust bean gum, soy protein isolate and pectin.

U.S. Pat. No. 4,238,520 to Miller, et al. describes a reduced fat spread which is an oil-in-water emulsion having from about 20% to about 40% fat. The spread utilizes a thickening agent which includes major proportions of hydroxypropylmethyl cellulose and microcrystalline cellulose and a minor proportion of sodium carboxymethyl cellulose.

U.S. Pat. No. 4,273,790 to Bosco, et al. is directed to a liquid spread having less than 30% of a dispersed fat. The spread has a continuous aqueous phase containing an emulsion stabilizer and an emulsifier system comprising a lipophilic emulsifier and a hydrophilic emulsifier. The stabilizer is a hydrophilic colloid which is selected from the group consisting of microcrystalline cellulose, carrageenan, guar gum, alginate, xanthan gum, soy protein isolate, methyl cellulose, carboxymethyl cellulose, ethyl cellulose, hydroxypropylmethyl cellulose, dextrins, starch, gelatin, locust bean gum, pectin and mixtures thereof.

U.S. Pat. No. 4,468,408 to Bosco, et al. is also directed to a liquid spread having a continuous aqueous phase containing an emulsion stabilizer and an emulsifier system comprising a lipophilic emulsifier and a hydrophilic emulsifier. The stabilizer is selected from the same group of stabilizers as are described in the '790 Bosco, et al. patent.

Thus, it can be seen that the prior art is replete with reduced fat spread products which, in general, utilize the same group of well-known hydrocolloid emulsion stabilizers.

It is an object of the present invention to provide a reduced-fat margarine-type spread utilizing a unique stabilizer. It is another object of the present invention to provide a low-fat spread prepared from liquid, edible vegetable oils wherein the liquid vegetable oil is thickened with calcium gluconate as a thickening agent.

SUMMARY OF THE INVENTION

The present invention is directed to a reduced-fat margarine-type spread prepared from liquid, edible vegetable oils. The spread is a two-phase emulsion comprising a continuous aqueous phase and a dispersed liquid oil phase. The emulsion contains from about 45% to about 65% liquid vegetable oil, from about 15% to about 20% of calcium gluconate, from about 18% to about 28% of water and from about 0.2% to about 1.2% of a hydrophilic emulsifier.

The invention is also directed to a method for making a margarine-type spread with reduced fat utilizing a liquid vegetable oil as the fatty component. In the method, a mixture of liquid vegetable oil, calcium gluconate, water and a hydrophilic emulsifier is subjected to high shear mixing to form a two-phase emulsion. The emulsion is permitted to stand quiescent until the mixture sets to a semi-solid with the consistency of tub margarine. The mixture is then subjected to trituration to provide a smooth, creamy consistency for the margarine-type product.

DETAILED DESCRIPTION OF THE INVENTION

The present invention is directed to an emulsion with a continuous aqueous phase and a dispersed phase of a liquid vegetable oil. The emulsion is thickened to provide a margarine-type consistency through use of calcium gluconate as a thickening agent. An emulsifier is also present to stabilize the emulsion.

In general, the spread product of the invention comprises liquid vegetable oil at a level of from about 45% to about 65%, calcium gluconate at a level of from about 15% to about 20%, water at a level of from about 18% to about 28% and a hydrophilic emulsifier at a level of from about 0.2% to about 1.2%.

The liquid vegetable oil can be any of the edible vegetable oils commonly used in the food industry. Such liquid vegetable oils include soybean oil, corn oil, cottonseed oil, safflower oil, canola oil, olive oil and mixtures thereof.

The calcium gluconate used as a thickening agent in the present invention is unique in that it is the salt of an organic acid. Prior art stabilizers known in the margarine industry are almost universally hydrocolloid materials which are polysaccharides in structure. The calcium gluconate is also used at much higher levels than the known hydrocolloid thickening agents. Calcium gluconate is present in the spread products of the invention at a level of from about 15% to about 20%.

The hydrophilic emulsifier will preferably comprise a member selected from the group consisting of polyoxyethylene (20) sorbitan monostearate, polyoxyethylene (20) sorbitan monooleate and mixtures of these.

These emulsifiers, commonly known as polysorbate 60 and polysorbate 80, respectively, are preferred in the practice of this invention; however, it is believed that other hydrophilic emulsifiers with a hydrophile-lipophile balance (HLB) of between 10 and 20, and preferably 13 and 16, will be operable. In this specification, the HLB of an emulsifier is used to classify the emulsifier in terms of its relative simultaneous attraction to the oil phase and the water phase of an emulsion. The least hydrophilic materials have a low HLB number and increasing HLB numbers correspond to increasing hydrophilicity. (See for example, Schick, *Nonionic Surfectants: Physical Chemistry*, pp. 439–447 (Marcel Dekker, Inc., New York, N.Y.; 1987).) Among other suitable emulsifiers are salts of fatty acid lactylates such as sodium and calcium stearoyl-2-lactylate; and the polyglycerol esters of fatty acids, such as octaglycerol monooleate. Also suitable are other of the polysorbates, such as polysorbate 65 which is otherwise known as polyoxyethylene (20) sorbitan tristearate. Various factors such as off-flavor, off-color and generally less desirable qualities of these other materials for use in foods make the aforementioned hydrophilic emulsifiers the most desirable choice in the practice of this invention. Polysorbate 60 and 80 are the most preferred because they provide a stiffness and spreading quality, especially a cold fracture quality, most like butter and margarine.

Polysorbate 60, polyoxyethylene (20) sorbitan monostearate, is a mixture of stearate and palmitate partial esters of sorbitol and sorbitol anhydrides condensed with approximately 20 moles of ethylene oxide ($C_2H_4O$) for each mole of sorbitol and its mono- and dianhydrides. It is a lemon to orange colored, oily liquid or semi-gel having a faint characteristic odor and a warm, somewhat bitter taste. It is soluble in water, aniline, ethyl acetate, toluene and is soluble at low levels in mineral and vegetable oils. Polysorbate 60 is commercially available under the trademarks Tween 60 from ICI-Atlas, SVS-18 from Hodag, Inc., Drewpone 60 from PV O International Inc. and Durafax 60 from SCM Corporation and GYSPS-20 from Glycol, Inc.

Polysorbate 80, polyoxyethylene (20) sorbitan monooleate, is a mixture of oleate partial esters of sorbitol and sorbitol anhydrides condensed with approximately 20 moles of ethylene oxide ($C_2H_4O$) for each mole of sorbitol and its mono- and dianhydrides. It is a yellow to orange colored, oily liquid having a faint, characteristic odor and a warm, somewhat bitter taste. It is very soluble in water, producing an odorless, nearly colorless solution, and is soluble in ethanol, fixed oils, ethyl acetate and toluene. Polysorbate 80 is commercially available under the trademarks Tween 80 from ICI-Atlas, SVO-9 from Hodag, Inc., Drewpone 80 from PVO International, Inc. and Durafax 80 from SCM Corporation and GYSPO-20 from Glyco, Inc.

Polysorbate 65, polyoxyethylene (20) sorbitan tristearate, is not as preferred as polysorbate 60 or polysorbate 80, but still provides an acceptable product. It is a mixture of stearate and palmitate partial esters of sorbitol and its anhydrides condensed with approximately 20 moles of ethylene oxide ($C_2H_4O$) for each mole of sorbitol and its mono- and dianhydrides. It is a tan, waxy solid having a faint, characteristic odor and a waxy, somewhat bitter taste. It is soluble at low levels in mineral and vegetable oils; at higher levels in mineral spirits, acetone, ether, dioxane and methanol; and is dispersible in water and carbon tetrachloride. Polysorbate 65 is commercially available under the trademarks Tween 65 from ICI-Atlas, Drewpone 65 from PVO International, Inc., Durafax 65 from SCM Corporation and GYSPTS-20 from Glyco, Inc.

The products of the invention are suitably colored and flavored to obtain the desired taste and appearance. Examples of coloring agents are beta carotene, annatto, turmeric, caramel color, paprika and FD&C dyes. Typically, the colors will be dissolved or dispersed in oil or the water phase to expedite blending. Representative of the flavors and/or flavor enhancers are sodium chloride, butter flavors, fruit flavors, spices, nut flavors, vegetable flavors, herbs, dairy flavors, distilled beverage flavors, cheese flavors, seafood flavors, meat flavors, candy flavors, essential oils, botanical extracts, oleo resins and other natural and synthetic flavors. Among the flavors suitable where a butter flavor is desired are lactones, lipolyzed butter oils and starter distillates; diacetyl, 2-octanone and other ketones; butyric acid; delta-hydroxy acids and their glycerol esters; and mixtures of any of these with other known dairy, buttery or like flavors or flavor notes. Among the fruit flavors are: apricot, apple, banana, blackberry, black currant, blueberry, cantaloupe, cherry, currant, grape, grapefruit, guava, honeydew, passion fruit, orange peach, pear, pineapple, plum, prune, raspberry, raisin, strawberry, watermelon and the like. Among the vegetable flavors are red and green peppers, tomato, carrot, celery, garlic, squash, pumpkin, onion, beet, pimento, turnip, parsley, chive and the like. Among the dairy and cheese flavors other than butter are sour cream, yogurt, cheddar cheese, cream cheese, swiss cheese, blue cheese, parmesan cheese, romano cheese and the like. Among the meat flavors are pork, bacon, ham, beef, turkey, chicken, sausage, pepperoni, hot dog, barbecued meat, veal, lamb and the like. The flavors can be artificial, natural extracts, concentrates or fresh or dried natural ingredients in whole or chopped form. It is an advantage of the invention that flavors have a very pronounced impact.

In addition to emulsion stability, the products of the invention are preferably stable against microbiological and oxidative deterioration. To control mold and yeast growth, the products desirably contain one or more preservatives such as benzoic acid, sorbic acid, phosphoric acid, lactic acid and the soluble salts of these and other like materials. Preferred as antimicrobials are potassium sorbate, sodium sorbate, potassium benzoate, sodium benzoate and phosphoric acid. The pH of the aqueous phase is desirably maintained at a value below 6.0 and preferably within the range of 5.0 to 5.9, to provide effective microbial control and good flavor with the lowest necessary levels of preservatives. Additional stability against oxidative deterioration at higher temperatures may be obtained by the use of the usual antioxidants, typically among which are normal propyl gallate, the several tocopherols, butylated hydroxanisole (BHA), butylated hydroxytoluene (BHT), nordihydroguaiaretic acid (NDGA), tertiarybutylhydroquinon (TBHQ) and citric acid.

While the products of the invention do not require proteins to obtain the proper texture or mouthfeel, they are sometimes desired for nutritional reasons as well as their positive contribution to the flavor and physical properties of the product. Additionally, protein can enhance freeze/thaw stability. Among the suitable protein materials are any of those known to the art for similar uses in spreads. These can include those derived from vegetable as well as animal sources. Thus, vegetable protein isolates such as those derived from soy, peanut, cottonseed, alfalfa, pea and the like; milk protein containing minerals such as nonfat dry milk, whey, caseinates, casein and delactosed whey and other nutritional proteins, can be employed in desired amounts. One suitable type of protein is that sold under the Melotein MP-14P trademark by Dairyland, Inc. These products are spray dried blends of milk proteins such as sweet dairy whey and caseinates. Typically, they are added in amounts of up to 10% based on the total weight of the spread. Preferred levels will be from 1% to 8% on this basis.

Also added can be any of the vitamins and minerals desired. Preferred among these are vitamins A and D which are normally associated with dairy products. If desired, these can be added in amounts approximating those in butter or margarine.

Also, where desired, a chelating agent such as ethylene diaminetetraacetic acid (EDTA), its salts, such as calcium sodium EDTA or the like can be employed to tie up metal ions which may otherwise detrimentally interact with one or more of the ingredients.

In the method of the invention, the various components of the spread product are mixed under high shear conditions to provide a blend with the consistency of heavy cream. The blend is permitted to stand until the blend sets into a semi-solid with the consistency of margarine. This usually takes place in a period of from about 1 to about 3 hours. The blend is then subjected to additional mixing using a suitable mixer to effect trituration of the blend. Suitable mixers include Muller type mixers and Sigma blade mixers. It is also acceptable to homogenize the blend, as a substitute for the trituration step. Homogenization could be done in a continuous media mill, a pressurized homogenizer, or similar device. The semi-solid margarine-type product obtained by the method provides a free-flowing liquid when the blend is melted.

The following example further illustrates various features of the invention, but is intended to in no way limit the scope of the invention as set forth in the appended claims.

EXAMPLE 1

A mixture of the following composition was blended in a stainless steel Waring blender jar:

| Ingredients | Weight |
| --- | --- |
| Soybean oil | 80 grams |
| Calcium gluconate | 24.48 grams |
| Water | 32.98 grams |
| Tween 80 | 1.0 gram |

Upon blending, this mixture formed a liquid with the consistency of heavy cream. After standing at room temperature for one hour, the mixture set to a semisolid with the consistency of tub margarine. The mixture appeared to be grainy, but upon trituration in a mortar, a smooth, creamy consistency was obtained. On a larger scale, this step could be performed using a continuous media mill, a pressurized homogenizer, or similar devices. A portion of the mixture was placed on a glass plate and heated over a bunsen burner. The solid melted, providing a free-flowing liquid in a relatively small amount of solid residue.

What is claimed is:

1. A two-phase emulsion comprising a continuous aqueous phase and a dispersed liquid oil phase, said emulsion containing from about 45% to about 65% liquid vegetable oil, from about 15% to about 20% of calcium gluconate, from about 18% to about 28% of water and from about 0.2% to about 1.2% of a hydrophilic emulsifier.

2. A two-phase emulsion as described in claim 1 wherein the liquid vegetable oil is soybean oil.

3. A two-phase emulsion as described in claim 1 wherein the emulsifier is a hydrophilic emulsifier with an HLB of between 10 and 20.

4. A two-phase emulsion as described in claim 1 wherein the emulsifier is selected from the group consisting of polyoxyethylene (20) sorbitan monostearate, polyoxyethylene (20) sorbitan tristearate, and polyoxyethylene (20) sorbitan monooleate.

5. A two-phase emulsion as described in claim 1 wherein the emulsifier is polyoxyethylene (20) sorbitan monostearate.

6. A two-phase emulsion as described in claim 1 wherein the emulsifier is polyoxyethylene (20) sorbitan monooleate.

7. A reduced-fat margarine-type spread prepared from a two-phase emulsion as described in claim 1.

8. A method for providing a two-phase emulsion comprising a continuous aqueous phase and a dispersed liquid oil phase comprising, a) providing a mixture containing from about 45% to about 65% liquid vegetable oil, from about 15% to about 20% of calcium gluconate, from about 18% to about 28% water and from about 0.2% to about 1.2% of a hydrophilic emulsifier, b) subjecting said mixture to high shear mixing to provide a blend, c) permitting said blend to stand to form a semi-solid, and d) subjecting said semi-solid to trituration or homogenization to provide a margarine-type spread.

9. A method for providing a two-phase emulsion as described in claim 8, wherein the liquid vegetable oil is soybean oil.

10. A method for providing a two-phase emulsion as described in claim 8, wherein the emulsifier is a hydrophilic emulsifier with an HLB of between 10 and 20.

11. A method for providing a two-phase emulsion as described in claim 8, wherein the emulsifier is selected from the group consisting of polyoxyethylene (20) sorbitan monostearate, polyoxyethylene (20) sorbitan tristearate, and polyoxyethylene (20) sorbitan monooleate.

12. A method for providing a two-phase emulsion as described in claim 8, wherein the emulsifier is polyoxyethylene (20) sorbitan monostearate.

13. A method for providing a two-phase emulsion as described in claim 8, wherein the emulsifier is polyoxyethylene (20) sorbitan monooleate.

* * * * *